United States Patent [19]
Skell et al.

[11] Patent Number: 5,744,793
[45] Date of Patent: *Apr. 28, 1998

[54] TRIANGULATION POSITION-DETECTION AND INTEGRATED DISPENSING VALVE

[75] Inventors: Daniel G. Skell, Cedarburg; Eric D. Skell, Hubortus, both of Wis.

[73] Assignee: Electro-Pro, Inc., Cedarburg, Wis.

[*] Notice: The term of this patent shall not extend beyond the expiration date of Pat. No. 5,550,369.

[21] Appl. No.: 583,801

[22] Filed: Jan. 5, 1996

Related U.S. Application Data

[63] Continuation-in-part of Ser. No. 202,792, Feb. 28, 1994, Pat. No. 5,550,369.

[51] Int. Cl.⁶ .......................... G01V 8/20; G01S 17/481; G01S 17/02; B67D 3/00
[52] U.S. Cl. .................. 250/222.1; 250/559.31; 250/223 B; 222/641
[58] Field of Search .................. 250/223 B, 222.1, 250/223 R, 221, 239, 559.29, 559.3, 559.31; 141/95, 198; 222/56, 640, 641, 644

[56] References Cited

U.S. PATENT DOCUMENTS

| | | | |
|---|---|---|---|
| 3,045,445 | 7/1962 | MacLeod et al. | 62/137 |
| 3,367,128 | 2/1968 | Hosoda | 62/137 |
| 3,727,056 | 4/1973 | Enemark | 250/218 |
| 3,731,496 | 5/1973 | Frazier | 62/137 |
| 3,842,263 | 10/1974 | Komrumpf et al. | 250/239 |
| 4,202,387 | 5/1980 | Upton | 141/360 |
| 4,282,430 | 8/1981 | Hatten et al. | 250/221 |
| 4,306,147 | 12/1981 | Fukuyama et al. | 250/221 |
| 4,437,499 | 3/1984 | Devale | 141/95 |
| 4,747,516 | 5/1988 | Baker | 222/129.1 |
| 4,822,996 | 4/1989 | Lind | 250/222.1 |
| 4,890,774 | 1/1990 | Poore | 222/640 |
| 4,917,155 | 4/1990 | Koblasz et al. | 141/1 |
| 4,972,883 | 11/1990 | Hassell | 141/1 |
| 4,973,834 | 11/1990 | Kim | 250/221 |
| 5,002,102 | 3/1991 | Hösel | 141/94 |
| 5,036,892 | 8/1991 | Stembridge et al. | 141/1 |
| 5,059,812 | 10/1991 | Huber | 250/577 |
| 5,159,834 | 11/1992 | Eisele | 73/293 |
| 5,164,606 | 11/1992 | Secord | 250/577 |
| 5,245,177 | 9/1993 | Schiller | 250/221 |
| 5,250,801 | 10/1993 | Grozinger et al. | 250/223 B |
| 5,550,369 | 8/1996 | Skell et al. | 250/222.1 |

FOREIGN PATENT DOCUMENTS

| | | |
|---|---|---|
| 2554244 | 5/1985 | France . |
| 2633081 | 12/1989 | France . |
| 4013743 | 11/1991 | Germany . |

OTHER PUBLICATIONS

Feinwerktechnik und Messtechnik, vol. 97, No. 6, 1 Jun. 1989 Munchen, DE, pp. 162–264.

*Primary Examiner*—Edward P. Westin
*Assistant Examiner*—John R. Lee
*Attorney, Agent, or Firm*—Whyte Hirschboeck Dudek S.C.; Timothy J. Ziolkowski

[57] ABSTRACT

A method and apparatus is provided to detect the position of an object, such as a container, in a target window using the concept of triangulation of energy radiation. A transmitter emits a pulse of energy in response to a periodic clock pulse which is at least partially reflected off the container positioned in the target window and into a receiver, forming an optical triangle. The signal produced by the receiver is checked to ensure that the energy indicative signal is synchronous with the periodic clock pulse to eliminate errant energy sources. The presence of a synchronous signal indicates the presence of an object in the target window wherein subsequent action may be taken, such as dispensing beverage and/or ice into a container within the target window. The invention is incorporated into a dispensing valve and may have the transmitter and receiver mounted vertically or horizontally. The invention is disclosed in an integrated, modular dispensing valve assembly incorporating all the components to accommodate easy retrofitting, and replacement of existing manually operated dispensing valves. The invention also includes the option of adding additional transmitter and receiver pairs to provide a level control to disable dispensing once the dispensed product reaches a given level in the container.

32 Claims, 11 Drawing Sheets

CIRCUIT BLOCK DIAGRAM

SYSTEM FLOWCHART

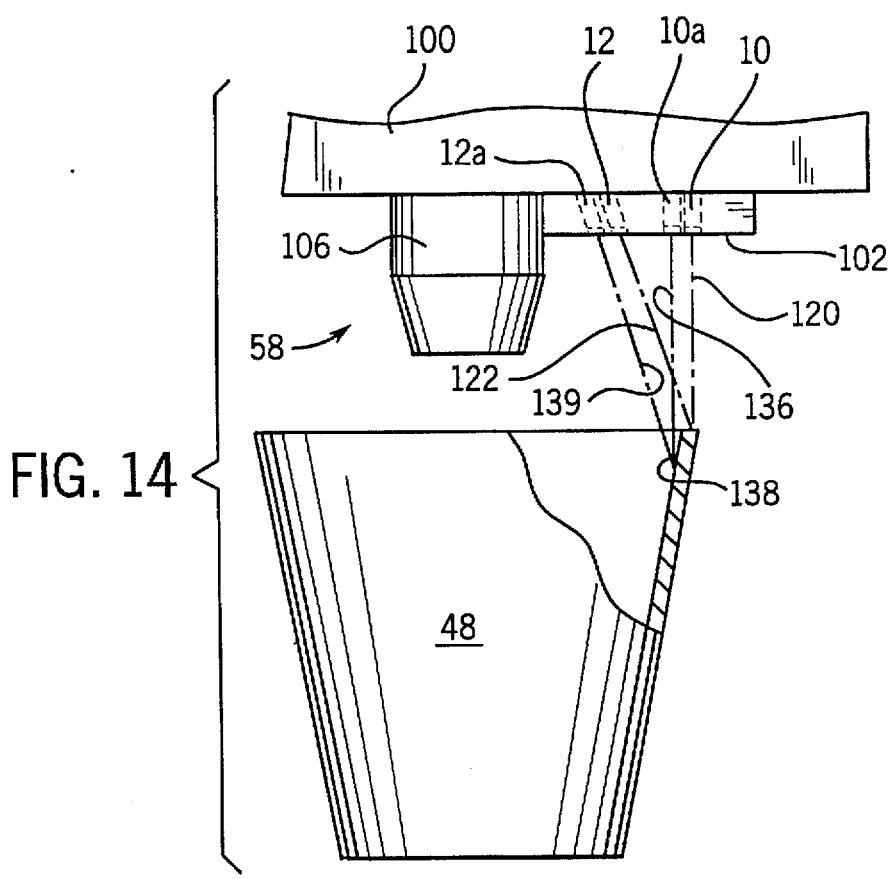

CIRCUIT BLOCK DIAGRAM

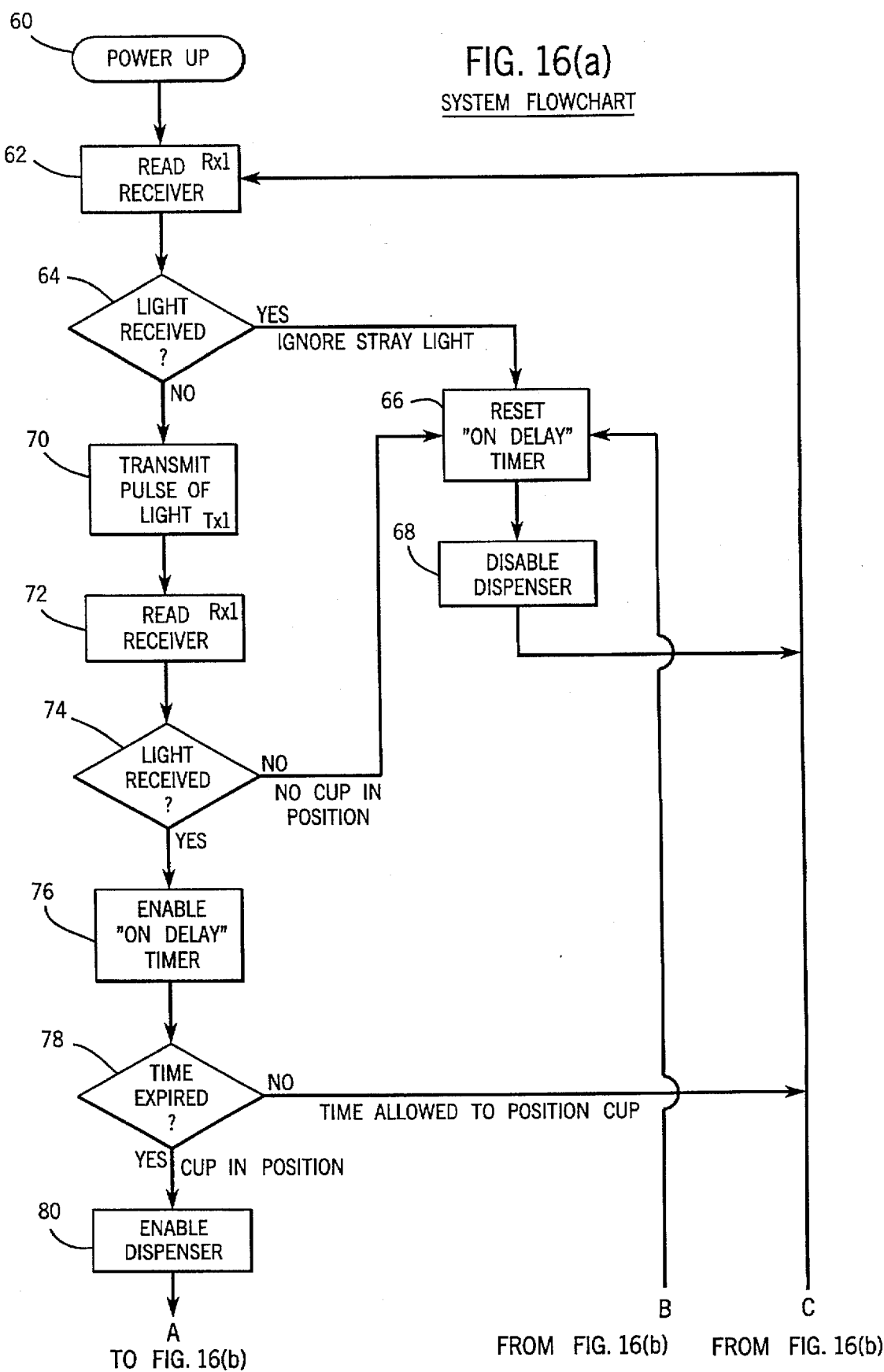

SYSTEM FLOWCHART

TRIANGULATION POSITION-DETECTION AND INTEGRATED DISPENSING VALVE

CROSS REFERENCE TO RELATED APPLICATION

This application is a continuation-in-part of U.S. application Ser. No. 08/202,792, filed Feb. 28, 1994 now U.S. Pat. No. 5,550,369.

BACKGROUND OF THE INVENTION

The present invention relates generally to a triangulation position detection method and device for detecting the presence of an object, such as a container, within a predetermined target window using energy radiation. More specifically, the invention is applied to a dispenser, such as a beverage and/or ice dispenser, and is incorporated into an integrated, modular dispensing valve.

The present invention evolved during continuing development and testing efforts directed toward providing an automatic dispensing valve control that is free of any physical contact with a container or by the person filing the container.

Generally, a beverage and ice dispenser consists of a mechanical push rod closing an electric switch or a manually operated push-button electric switch which actuates a dispenser to dispense product. It is thought that such dispensers transmit communicable diseases. For example, a person with such a disease who drinks out of a cup and returns to the dispenser to refill the cup must contact the cup to the dispensing push rod such that germs may be transferred from the cup to the push rod wherein the next individual to use the mechanical dispenser may come in contact with the germs by drinking from a cup subsequently placed against the same push rod.

Aside from making the dispenser control fully automatic, a main consideration in the continued development of the present invention is to provide an automatic dispensing valve which can compete economically with the prior art lever actuated dispensing valve, and the manually operated push button electric switch type valve. To be commercially successful in this market, a dispensing valve must demonstrate not only the automatic characteristics of detecting the presence of a container and activating a dispenser in response to that detection, but also deactivating the dispenser in response to the removal of the container from the dispensing position, and also demonstrate a degree of reliability at least equal to the prior art lever actuated dispensing valves and/or the manual electric switch dispensing valves, as well as economic feasibility as compared to those prior art valves.

Many attempts have been made to produce such a valve, but have fallen short of satisfying all the requirements to become commercially successful. For example, U.S. Pat. No. 4,202,287 issued to Upton, discloses a fluid dispensing control system sensing a container size with a set of photosensor and associated light sources that activate a timer in the control system for dispensing fluid for a predetermined time dependent on the container size detected. However, this system continues to dispense until a timing cycle is completed regardless of whether or not the cup is still present under the dispensing valve. Further, the amount of fluid dispensed is dependent upon preset container sizes. That is, if an establishment changes the size of its medium size cup, the preset amount of fluid dispensed for a medium size cup must be changed, or the cup will not be filled or will be overfilled.

Another type of switching device for sensing an object is disclosed in U.S. Pat. No. 4,973,834 issued to Kim. Kim discloses an optical switching device employing a frequency synchronous circuit having a synchronous stage coupled to a light sensor for synchronizing the frequency of the detection pulse train with an adjustable free running frequency. Kim requires a frequency detector to synchronize an incoming object detection pulse train with the free running frequency of the voltage controlled oscillator in a phase locked loop circuit which is adjustable externally. Such synchronization and frequency detection adds excessive cost to a dispensing valve. Further, external adjustment is required for precise detection of moving objects in a dispenser application, and it is undesirable to require or even permit the operator of a dispensing machine to make any adjustments to an automatic dispensing valve.

Another attempt at automatic dispensing is shown in U.S. Pat. No. 4,437,499 issued to DeVale, wherein a computer controlled sensor is used for beverage dispensing. The control has a memory stored with predetermined dispensing times for small, medium, and large size cups. An operator of such a dispensing machine having such a control is required to initially program the computer with the predetermined times of dispensing for each size cup. If cup sizes are changed, the system needs to be reprogrammed. Another disadvantage to this system is that the time for filling is dependent upon whether or not ice is in the cup, and how much ice is in the cup. If the system is trained to fill a cup that is half filled with ice, each time thereafter it must have the same amount of ice in order to fill the cup to the correct level. Any deviation in the ice level will result in an overfilled or under filled condition.

Yet another type of automatic dispensing valve is disclosed in U.S. Pat. No. 5,036,892 issued to Stembridge et al., which discloses a system using ultrasonic wave energy for sensing the machine grate, the cup lip, the top of any ice in the cup, and the rising liquid level, and thereafter generates signals corresponding to the travel time of the ultrasonic energy to a control module. In order to accomplish this, Stembridge et al. changes the gain for various distance measurements. Further, Stembridge et al. has dip switches for setting the ice level. If it is determined that the actual ice height in a container is greater than that allowed by the dip switch settings, an over-ice indicator flashes and the cup detection routine begins again. The system will not activate the dispenser unless the actual ice height is less than the amount selected by the dip switches. The use of ultrasonics and extensive software and hardware results in the Stembridge et al. system being a relatively expensive dispensing valve, as compared with the lever actuated, or electric switch operated dispensing valves.

Other prior art devices include heat sensing devices which are typically used for activating water faucets in response to sensing heat generated by the operator's hand within a certain proximity of the faucet. These devices are not very accurate in determining position because of their temperature dependency. Heat sensing devices are activated when an object of a given temperature is at a certain proximity to the heat sensing device. However, if the temperature is lower than the temperature expected at the given proximity, the device will not be activated until the object with lower temperature is brought closer to the heat sensing device which shortens the expected proximity. In other words, an object's distance from the heat sensing device, to activate the device, will vary with temperature and therefore will not give precise and predictable results.

Another type of position sensing device is a light beam interrupter system in which a beam of infrared light is transmitted to a photodetector mounted opposite the infrared transmitter which transmits a steady light beam and wherein the interruption of the light beam indicates the presence of an object therebetween. For example, see U.S. Pat. No. 4,822,996 issued to Lind. This type of system is only capable of determining whether an object is present between the transmitter and the receiver and not the proximity or position of an object. In other words, this type of a detector would only function on a single axis.

An alternative transmitter and receiver arrangement was provided by Hösel, U.S. Pat. No. 5,002,102 which emits a steady beam of light from a transmitter which is reflected back to a receiver mounted adjacent the transmitter. The Hösel system requires a microcomputer with a microprocessor for calculating a distance between the transmitter/receiver and the fill level in a bin—the distance being an inverse function of the intensity of the light beam. The Hösel apparatus is based on direct reflection, that is, it simply emits light and determines how much is returned to determine the fill level distance and is therefore limited to detection on a single axis, and unless confined within a closed system such as the fiber storing bin disclosed by Hösel, the Hösel device would be susceptible to stray light sources and be inoperative in the presence of such stray light sources.

One of the disadvantages of many prior systems is that they are limited to detection on a single axis and therefore are not true position detection devices. In other words, a light beam interrupter system, for example Lind U.S. Pat. No. 4,822,996, detects an interruption in the light beam anywhere in the linear axis defined to extend from the light emitting source to the light receiving detector, and cannot differentiate the position of the interruption along that linear axis. A heat sensing device may be able to detect on multiple axes, but unless the temperature of the intruding object is constant, the point of detection varies with the temperature of the object, and therefore true position detection cannot be achieved.

SUMMARY OF THE INVENTION

The present invention overcomes the aforementioned disadvantages of the prior art devices by using the concept of triangulation and simplifies the circuitry by using inexpensive, discrete components to digitize an energy beam of the triangulation position detection device. The present invention uses an energy beam produced by a transmitter mounted in the same general plane as that of a receiver. The transmitter and receiver have lines of projection and reflection, respectively, which form a target intercept point at a given distance from the mounting plane. The transmitter, receiver, and target intercept point form the three corners of a triangle which forms the basis for the triangulation concept. An energy transmitter typically has a radiation pattern with an amount of energy beam diffusion forming a cone-shaped energy beam. The radiation pattern can be controlled by recessing the transmitter in an orifice to control the size of the cone-shaped energy beam. Similarly, the receiver can be recessed to receive a given amount of reflected energy. Recessing the transmitter and receiver creates a target window having a volumetric shape of intersecting cones having a shape formed by the cone-shaped energy beam emitted by the transmitter intersecting the conical outline of the reflected energy beam to the receiver. The target intercept point is generally at the center of the target window.

In operation, when an object enters the three-dimensional target window, a portion of the emitted energy beam is reflected in the direction of the receiver. The greater the object occupies the volumetric target window, the greater the portion of energy beam is reflected into the receiver. When the object passes the target intercept point and is sufficiently within the volumetric target window, enough of the emitted energy beam is received by the receiver for the control circuitry to recognize that an object is in position. In this manner, the present invention is said to detect the presence of an object on three axes. That is, if an object is too far to the right or too far to the left (X-axis), too high or too low (Z-axis), too close or too far (Y-axis), the object will not be sufficiently within the volumetric target window and will not be detected.

The present invention is implemented using a digitized, or pulsed, light beam which eliminates the need of a microprocessor and allows the system to ignore errant and stray light beams. The system includes a clock which activates the transmitter to emit a pulse of light equal in time to the pulse width created by the clock. This allows the control circuitry to ignore any errant and stray light received by the receiver when the transmitter is not emitting a pulse of light. The control circuitry includes an amplifier and a signal strength detector to ensure that the object occupies a majority of the volumetric target window. A synchronous checker functions to ignore all light received while the transmitter is not emitting a pulse of light.

The system can be used for a beverage and/or ice dispensing unit wherein a delay can be provided to not only ensure that a cup is adequately in place under the dispenser, but also to eliminate nuisance dispensing. The system then activates the dispenser until the cup is no longer sufficiently within the volumetric target window wherein the control is instantly disabled.

The triangulation position detection device disclosed is implemented with discrete circuitry, however, the system may easily be adapted into a microprocessor based circuit and implemented via software. A flow chart is provided for this purpose.

During continued development, it has been found that placing the transmitter and receiver adjacent the dispenser, such that the axes of reflection and projection are in a downward direction, greatly enhances the capability of detecting the presence of certain objects that otherwise would be difficult to detect. For example, where the transmitter and receiver are mounted vertically, and a clear plastic or glass container is brought into the target window, the clear plastic or glass may not reflect enough energy to activate the automatic dispenser control. It has been found that placing the transmitter and receiver horizontally and directed downwardly to detect the leading edge of the container, along with the inside side surface of the container, solves this problem. Additionally, placing the transmitter and receiver horizontally eliminates many stray, or interfering signals from disrupting the detection. This also allows the control to be more sensitive, thereby allowing more accurate detection of containers in various configurations, and of those made of virtually any material.

An additional advantage to the aforementioned configuration includes the ability to produce an integrated container-sensing dispensing valve readily interchangeable with existing manually actuated dispensing valves, such as lever actuated or push button dispensing valves. In this manner, the present invention also includes a method of retrofitting a manually operated dispensing machine having lever actuated dispensing valves, with container-sensing dispensing valves to create an automatic dispensing machine. The method of retrofitting includes removing the cover from the lever actuated dispensing valve, disconnecting the power supply, and removing the lever actuated dispensing valve. The method then includes the step of installing the container-sensing dispensing valve which has an integrated control for detecting the presence and absence of a container under the dispensing valve and is capable of activating the dispensing valve according to the detection.

The integrated control has at least one transmitter and receiver pair orientated in a generally horizontal plane such that a transmission from a transmitter converges with a line of reception from a receiver at a target window below the dispensing valve. However, in a preferred embodiment, less expensive transmitters and receivers can be used if they are paired up in accordance with their sensitivity. For example, one preferred embodiment uses three pairs of transmitters and receivers, the transmitters connected serially and the receivers connected in parallel. The integrated control also includes a control circuit mounted in the container-sensing dispensing valve, and connected to the transmitter and receiver pair. Preferably, where space permits, the transmitter and receiver pair are mounted directly on the circuit board of the control. It is contemplated that a surface mount circuit board will provide such a configuration. The control circuit periodically activates the transmitters and periodically monitors the receivers to indicate the presence of a container in the target window when a reflected transmission is detected substantially synchronously with the activation of the transmitter, thereby indicating the container is in a desired position, and activating the dispenser. The control also indicates the absence of the container when the monitored receiver does not detect one or more reflected transmissions, thereby indicating the container is no longer in position and deactivating the dispenser.

The method of retrofitting lastly includes the steps of connecting the existing power supply from the dispensing machine to the container-sensing dispensing valve and installing the cover on the dispensing valve.

In an alternate embodiment, the control circuit for the dispensing valve can be located remotely in the dispensing machine with the transmitter and receiver mounted horizontally near the dispenser. Still another embodiment includes placing the transmitter and receiver vertically in a back plane of the dispensing machine.

In yet another embodiment of the present invention, at least one additional transmitter and receiver pair are added to the dispensing valve to provide level control that automatically disables the dispenser once the dispensed product reaches a given height in the container. The additional transmitter and receiver pair is enabled sequentially with the first transmitter and receiver pair, and are focused to provide a sharp beam of energy into the container for sidewall detection. Once the dispensed product reaches the point of interference with the sidewall detection, the transmitted beam of energy is partially absorbed into the liquid, and what is reflected, is scattered such that any received signal by the corresponding receiver is too weak to trigger the control, and thereby disables the dispenser from dispensing any further product. Since the additional transmitter and receiver pair is enabled sequentially with the first transmitter and receiver pair, the transmitter and receiver pairs do not interfere with one another, and additional pairs can be added for more accurate level control and level monitoring.

Additional benefits and advantages of the present invention will become apparent from the subsequent detailed description of the preferred embodiment, the drawings, and the claims.

BRIEF DESCRIPTION OF THE DRAWINGS

FIG. 14 is a side elevation view of a dispensing valve in operational relation with a container similar to FIG. 11, and incorporating another aspect of the present invention.

FIG. 16(a)–16(b) is a system flow chart in accordance with the present invention of FIG. 14.

DETAILED DESCRIPTION OF THE PREFERRED EMBODIMENT

Figure 1:
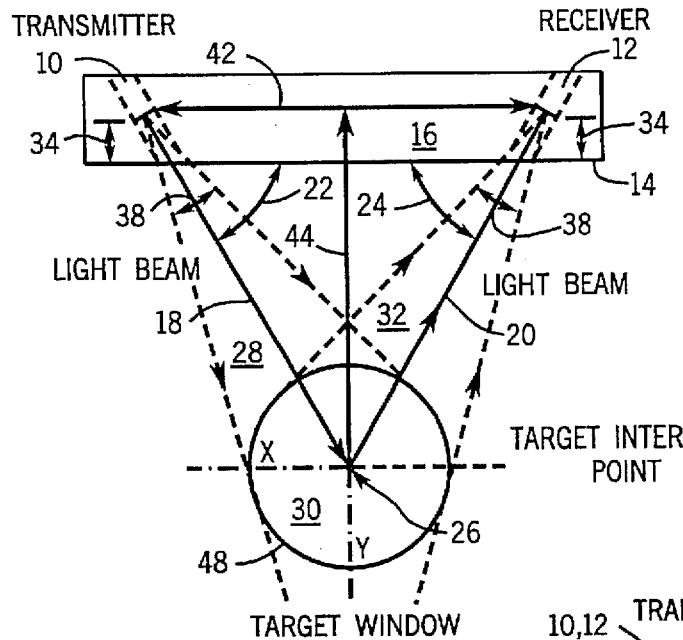
FIG. 1 is a schematic illustration in top plane view of a system in accordance with the invention.

Referring to FIG. 1, transmitter 10 and receiver 12 are mounted in plane 14 of mounting block 16. Transmitter 10 and receiver 12 are orientated in mounting block 16 such that an axis of projection 18 of transmitter 10 and an axis of reflection 20 of receiver 12 are 45° to plane 14 of mounting block 16 as shown by angles 22 and 24. Axes of projection and reflection 18 and 20 converge at target intercept point 26 which defines a point above which a dispensing spigot (not shown) is located to dispense beverages, ice, or any other type of dispensable product. Light beam 28 emitted from transmitter 10 has a cone-shaped radiation pattern which defines volumetric target window 30 such that when a container 48, for example a cup, glass, or other beverage holder, is placed within volumetric target window 30, at least a portion of light beam 28 is reflected toward receiver 12 as reflected light 32 having a cone-shaped sensing pattern.

FIG. 1 shows the general concept behind triangulation position detection wherein an object placed within volumetric target window 30 reflects at least a portion of the emitted light beam 28 from transmitter 10 toward receiver 12. The more an object occupies target window 30, the larger the portion of light beam 28 is reflected into receiver 12. This forms the basis for the triangulation theory of position detection. In other words, as an object begins to enter target window 30, only a small portion of light beam 28 is reflected off the object and toward receiver 12. The intensity of reflected light beam 32 increases as more of the object occupies target window 30. Preferably, when the leading edge of the object passes intercept point 26, the dispenser is activated by the intensity of reflected light beam 32.

Figure 2:
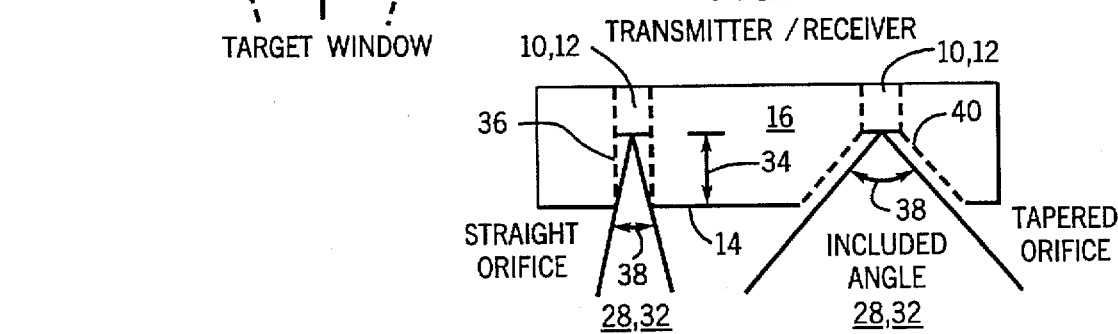
FIG. 2 is a schematic in top plane view of various mounting arrangements for a portion of the system of FIG. 1.

Transmitter 10 and receiver 12 are recessed in mounting block 16 a recessed distance 34 for controlling the radiation pattern. As shown in FIG. 2, the preferred embodiment uses a straight orifice 36 which acts as a wave guide for narrowing light beam 28 emitted from transmitter 10 and reflected light 32 received by receiver 12. Recessed distance 34 controls the radiation pattern by varying included angle 38. Increasing recessed distance 34 by recessing transmitter 10 further inside mounting block 16 decreases included angle 38 which results in a smaller target window 30, FIG. 1. Conversely, reducing recessed distance 34, FIG. 2, by mounting transmitter 10 closer to plane 14 provides a larger included angle 38 which results in a larger target window 30, FIG. 1.

Alternatively, a tapered orifice 40 in mounting block 16 provides similar results by machining a taper in plane 14 of mounting block 16. A wider taper provides a larger included angle 38 and a larger target window 30, FIG. 1. A narrower taper 40, FIG. 2, provides a smaller included angle 38 and a smaller target window 30, FIG. 1. Straight orifice 36 is preferred because it is simply implemented by drilling a hole in mounting block 16, whereas tapered orifice 40 requires drilling a straight orifice for transmitter 10 and receiver 12, then machining the required taper corresponding to a desired target window 30, FIG. 1. Straight orifice 36 is also preferred because included angle 38 and the resulting target window size may be easily altered by simply adjusting recessed distance 34 of transmitter 10 and receiver 12. By testing the system with various containers, it was found that a preferred included angle 38 of 10° provided a target window 30, FIG. 1, which accommodates a majority of beverage cup sizes.

As previously described, the size of target window 30, FIG. 1, is generally dependent upon included angle 38, FIG. 2, and recessed distance 34; however, target intercept point 26 is defined by mounting angles 22 and 24 in combination with mounting distance 42 and since light beam 28, FIG. 1, is cone-shaped, varying target intercept point 26 has a corresponding effect on the size of target window 30. Mounting distance 42 is the distance transmitter 10 and receiver 12 are mounted apart from one another in mounting block 16. As can be seen in FIG. 1, holding mounting distance 42 constant and decreasing mounting angles 22 and 24 brings target intercept point 26 closer to mounting block 16 and decreases of target intercept distance 44 which also decreases the size of target window 30. Conversely, increasing mounting angles 22 and 24 increases target intercept distance 44, extending the size of target intercept point 26 further away from mounting block 16 which increases target window 30. Similarly, holding mounting angles 22 and 24 constant and increasing mounting distance 42 increases target intercept distance 44, extending target intercept point 26 further away from mounting block 16 which also increases the size of target window 30. Conversely, decreasing mounting distance 42, decreases target intercept distance 44 bringing target intercept point 26 closer to mounting block 16 and decreases the size of target window 30. Target window 30 is centered about target intercept point 26 and moves correspondingly. In this embodiment, a mounting distance 42 of approximately 2.5" with a mounting angle of 45° provides a desired target intercept distance of approximately 1.75". However, these parameters are easily adjustable to acquire various target intercept distances, as previously described.

Figure 3:
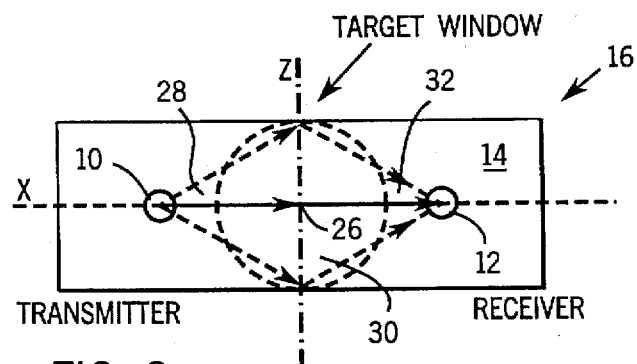
FIG. 3 is a horizontal plane view of the system of FIG. 1.
Figure 4:
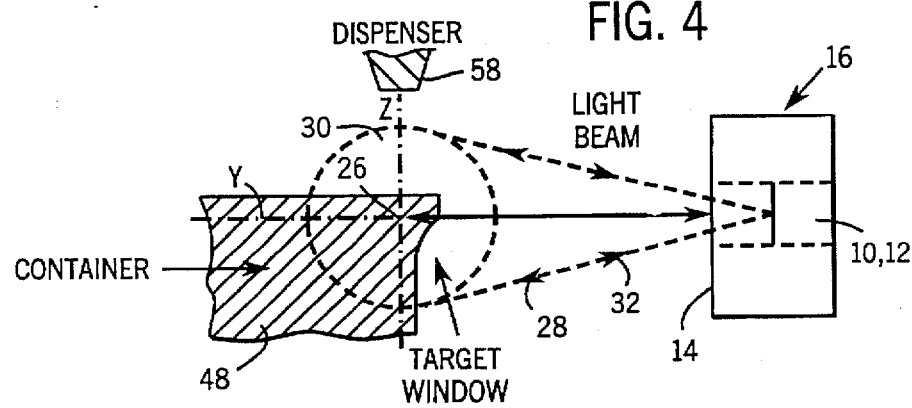
FIG. 4 is a side elevation view of the system of FIG. 1.

FIG. 3 shows a horizontal view of mounting block 16 in which transmitter 10 and receiver 12 are mounted in plane 14. While FIG. 1 shows target window 30 on a two-dimensional X-Y axis, FIGS. 3 and 4 show a third dimension of target window 30 on the Z axis. FIG. 4 shows a profile view of mounting block 16 in which light beam 28 is emitted from transmitter 10, reflected off container 48 in target window 30, and returned as reflected light beam 32 to receiver 12 in mounting block 16. When a sufficient portion of container 48 is within target window 30, the dispenser is activated to dispense product.

Figure 5:
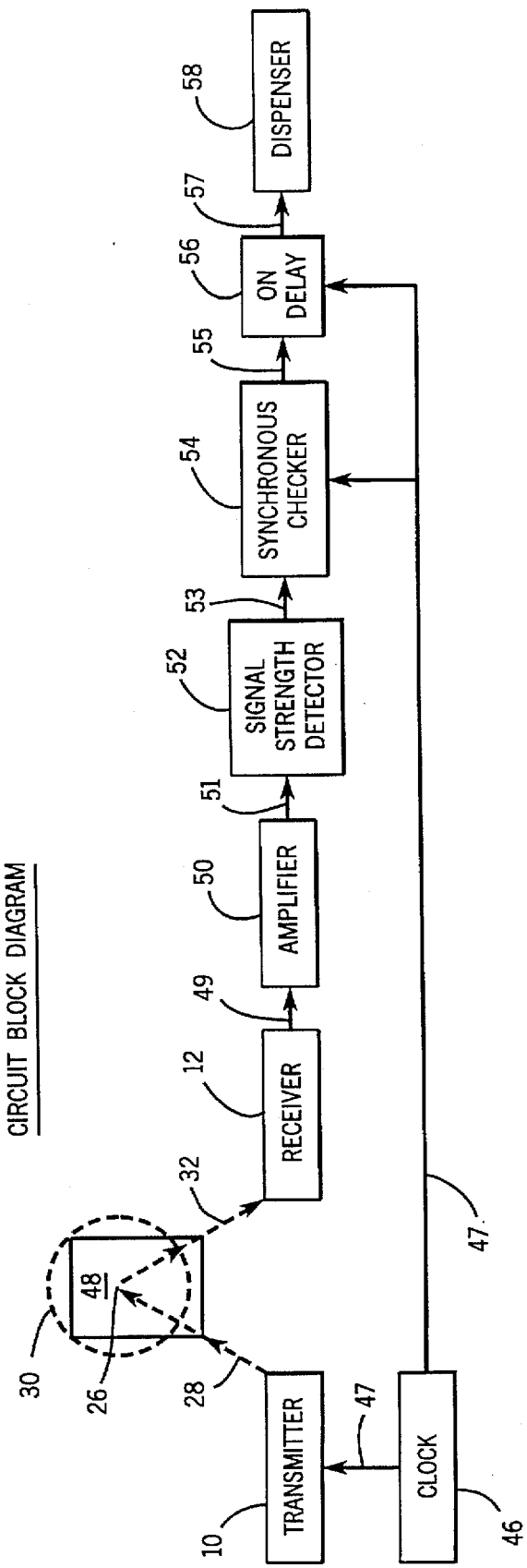
FIG. 5 is a circuit block diagram of a system in accordance with the invention.

FIG. 5 shows a block diagram of the circuit used to implement the triangulation position detection device of FIG. 1. Clock 46 is connected to transmitter 10, synchronous checker 54 and ON delay 56. Transmitter 10 emits pulse light beam 28 in response to receiving a periodic clock pulse 47 from clock 46. Pulse light beam 28 is reflected off an object, for example a cup 48, in target window 30 as reflected light beam 32 toward receiver 12. Receiver 12 produces a light indicative signal 49 in response to receiving pulse light beam 32. Amplifier 50 is connected to receiver 12 and amplifies light indicative signal 49. Signal strength detector 52 receives the amplified light indicative signal 51 from amplifier 50 and compares amplified light indicative signal 51 against a predetermined parameter to detect whether a sufficient amount of light beam 32 was reflected into receiver 12. Signal strength detector 52 produces a signal strength signal 53 when the amplified light indicative signal 51 is greater than the predetermined parameter, and the synchronous checker 54 determines whether the signal strength signal 53 occurs substantially synchronously with the periodic clock pulse from clock 46. Synchronous checker 54 ensures that the light received in receiver 12 was indeed produced by transmitter 10 and produces a synchronous signal 55 in response. The synchronous signal 55 is received by ON delay 56 which is connected to clock 46 and dispenser 58, and delays activating dispenser 58 to ensure that container 48 has passed the target intercept point 26 of FIG. 1, and occupies a majority of target window 30. In the preferred embodiment, it was found that a 100 millisecond delay was sufficient to ensure that the edge of cup 48 has passed target intercept point 26, which avoids spilling dispensed product over the leading edge of cup 48. ON delay 56 then creates dispensing signal 57 to activate dispenser 58.

Figure 6:
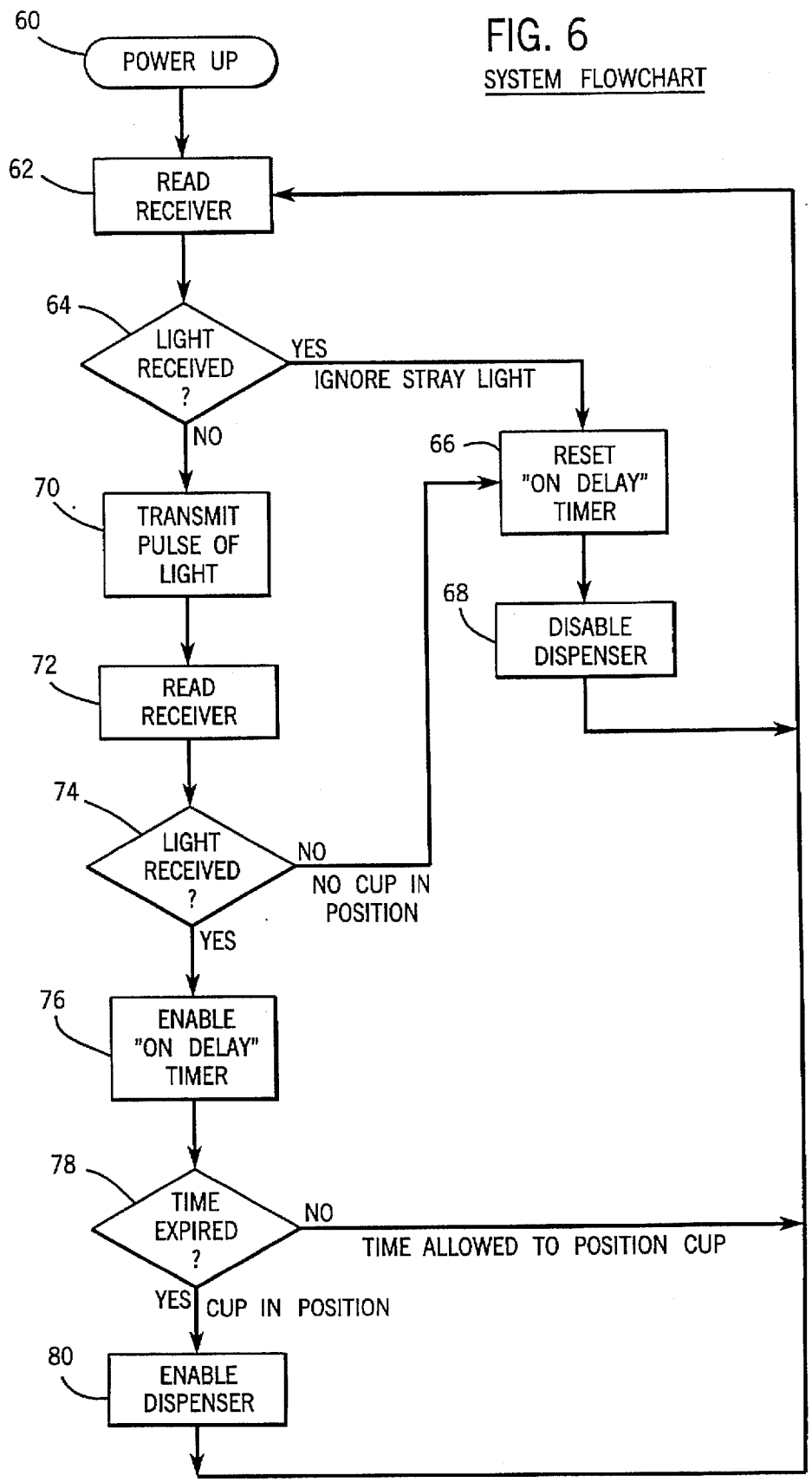
FIG. 6 is a system flow chart in accordance with the invention.

FIG. 6 is a system flow chart of the triangulation position detection device which would guide implementing the device with a microprocessor and software. At power up 60 the receiver is read 62 and checked to see if light is received 64. If light is received, it is interpreted as stray light and ignored by the system by resetting the ON delay timer 66 and disabling the dispenser 68 to ensure the dispenser is deactivated. The system then reads the receiver 62 again, ensures that no stray light is received 64, and transmits a pulse of light 70. The receiver is read 72, and a determination is made as to whether a sufficient amount of light is received 74. An insufficient amount of light received is an indication that the cup is not yet in position or a stray light signal was received. In those cases, the ON delay timer is reset 66, the dispenser is disabled 68, and the loop is started again by reading receiver 62. If sufficient light is received 74, the ON delay timer is enabled 76. The loop is repeated until the desired delay time is expired 78 which allows enough time to position the cup sufficiently under the dispenser. When the delay time has expired 78, the cup is in position and the dispenser is enabled 80. The entire flow chart is repeated checking to make sure that the cup stays in position while dispensing. If a pulse of light is transmitted 70 but not sufficiently received 72, 74, the ON delay timer is reset 66 and the dispenser is immediately disabled 68 which provides an instant OFF when the cup is no longer sufficiently in target window 30, FIG. 1.

Figure 7:
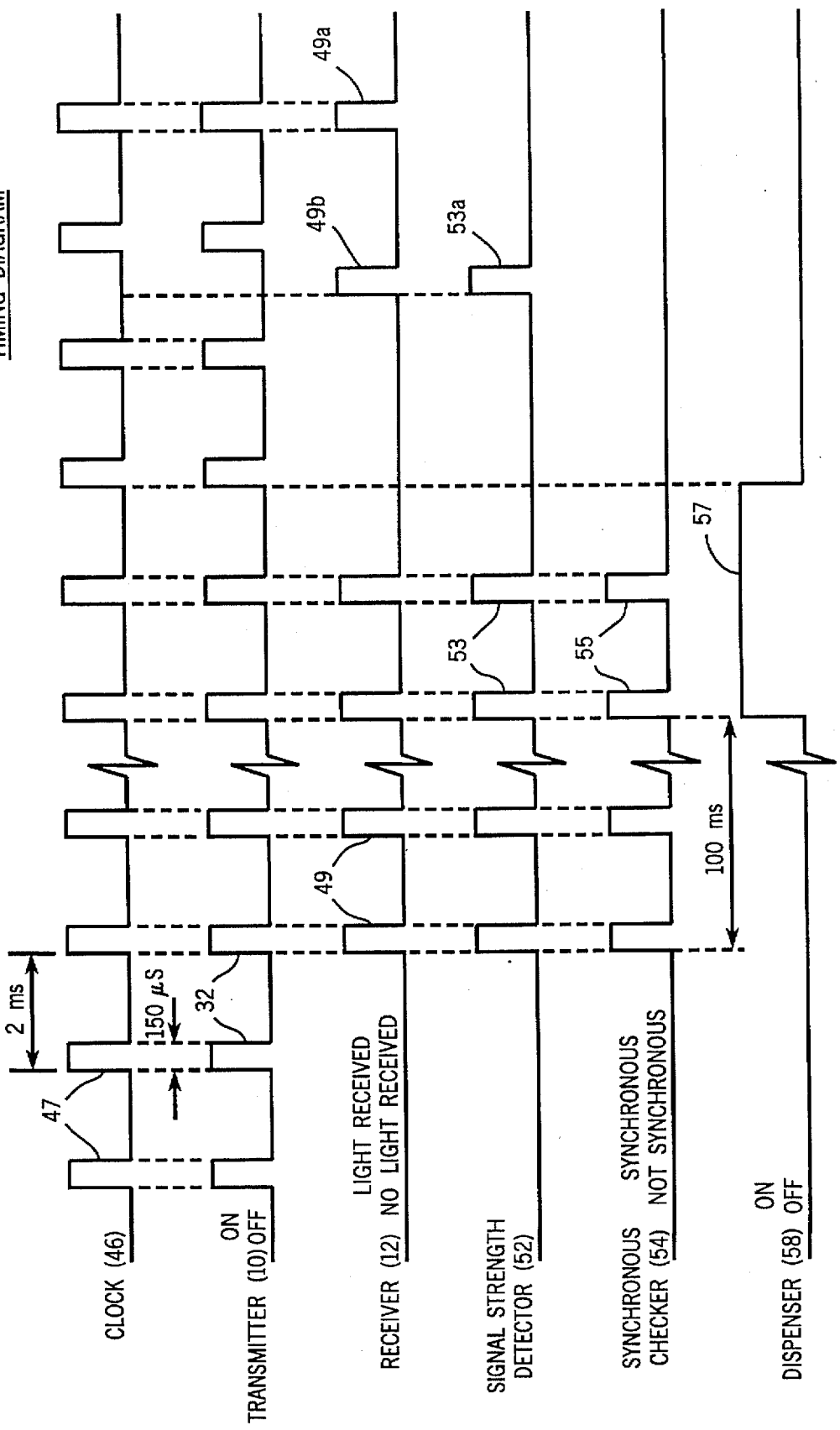
FIG. 7 is a timing diagram of a system in accordance with the invention.

FIG. 7 shows a timing diagram with various examples of operation. Clock (46) produces periodic clock pulses 47 having a period of 2 ms. and a pulse width of 150 μs. Clock (46) enables transmitter (10) which provides a pulse of light 32 with the same periodicity as clock pulses 47. Transmitter (10) has a time of emission equal to the clock pulse width The transmitter produces a pulse of light 32 substantially equal in time to the clock pulse 47 produced by the clock. Receiver (12) produces light indicative signals 49 when light is received. Signal strength detector (52) shows signal strength signals 53 coinciding with light indicative signals 49 only when light indicative signals 49 are greater than a predetermined parameter. For example, light indicative signal 49a is not greater than the predetermined parameter and therefore no corresponding signal strength signal 53 is shown. Light indicative the presence of signal 49a may indicate a stray or errant light source. Synchronous checker 54 has synchronous signals 55 only when the signal strength signals 53 are substantially synchronous with the periodic clock pulses 47. For example, signal strength signal 53a corresponding to light indicative signal 49b is not synchronous with any clock pulse 47 and therefore does not have a corresponding synchronous signal. Dispenser (58) receives dispensing signal 57 which is delayed 100 ms. from the first occurrence of a synchronous signal 55. Dispensing signal 57 has an ON pulse width dependent upon the reoccurrence of synchronous signals 55. ON delay 56, FIG. 5, holds dispenser 58 in the enable mode until a clock pulse 47, FIG. 7, occurs in the absence of a synchronous signal 55, at which point dispensing pulse 57 goes low disabling dispenser (58).

Figure 8:
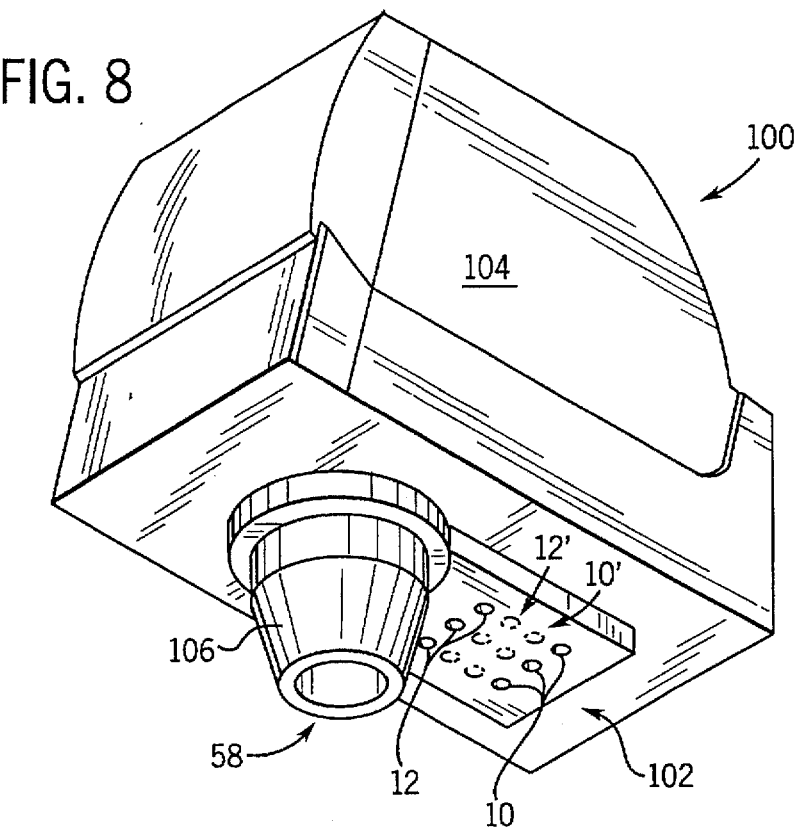
FIG. 8 is a perspective view of a dispensing valve in accordance with one embodiment of the present invention.

FIG. 8 shows an alternate embodiment of the present invention incorporated into a dispensing valve 100. While FIG. 4 shows the transmitter 10 and the receiver 12 mounted in a vertical plane 14 that is generally perpendicular to that of dispenser 58, FIG. 8 shows the transmitter 10 and the receiver 12 mounted in a horizontal plane 102 that is generally planar with that of dispenser 58. In the configuration of FIG. 8, it is preferable to use three transmitters 10 and three receivers 12 for economical considerations. That is, using three inexpensive transmitter and receiver pairs will result in at least as good as detection as one relatively more expensive transmitter and receiver pair. Therefore, one skilled in the art, will readily understand that the three transmitter and receiver pairs can be equivalently replaced with a single transmitter and receiver pair. Similarly, additional transmitter and receiver pairs 10' and 12' can be added to accentuate the aforementioned advantages to using three transmitter and receiver pairs. Further, the positions of transmitters 10 and receivers 12 could be reversed, or rotated 90°. There are various configurations for the transmitter and receivers that will function equivalently with the present invention. In some respects, the arrangement of the transmitter and receiver depends on the available space in the particular valve assembly 100, so as to use existing valve housings.

Figure 11:
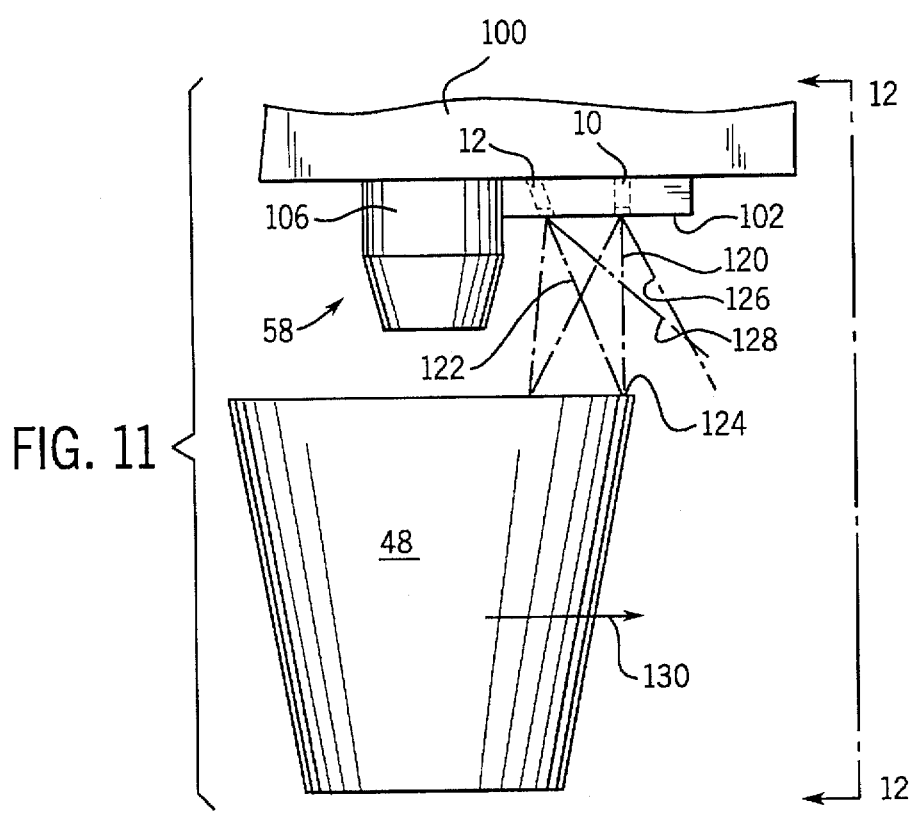
FIG. 11 is a side elevation view of a portion of the dispensing valve of FIG. 8 in operational relation with a container.
Figure 12:
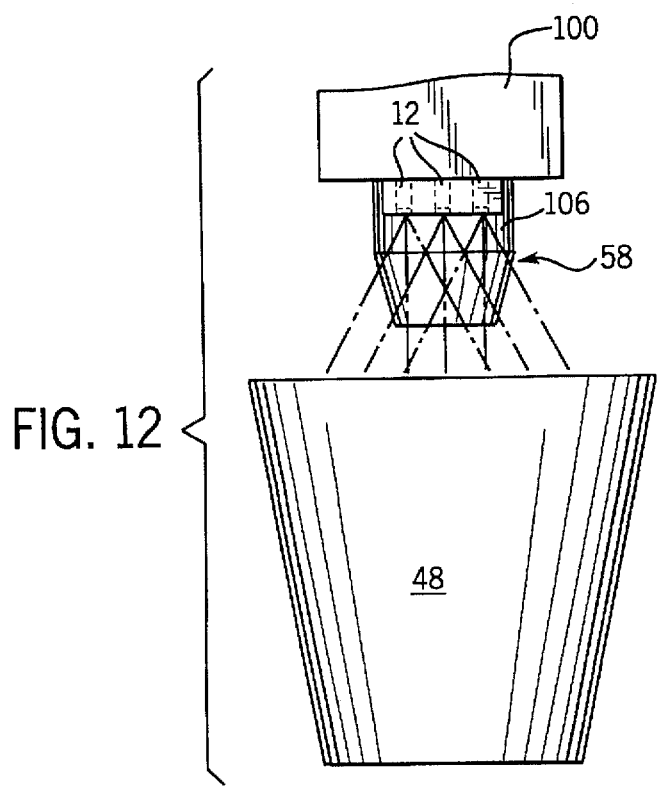
FIG. 12 is a rear elevation view of FIG. 11 taken along line 12—12.

FIG. 8 shows dispensing valve 100 having a cover 104 and a dispensing spigot 106. The transmitters 10 and receivers 12 are orientated adjacent the dispensing spigot 106 and have an axes of projection and reflection extending downwardly, as best shown in FIGS. 11 and 12.

Figure 9:
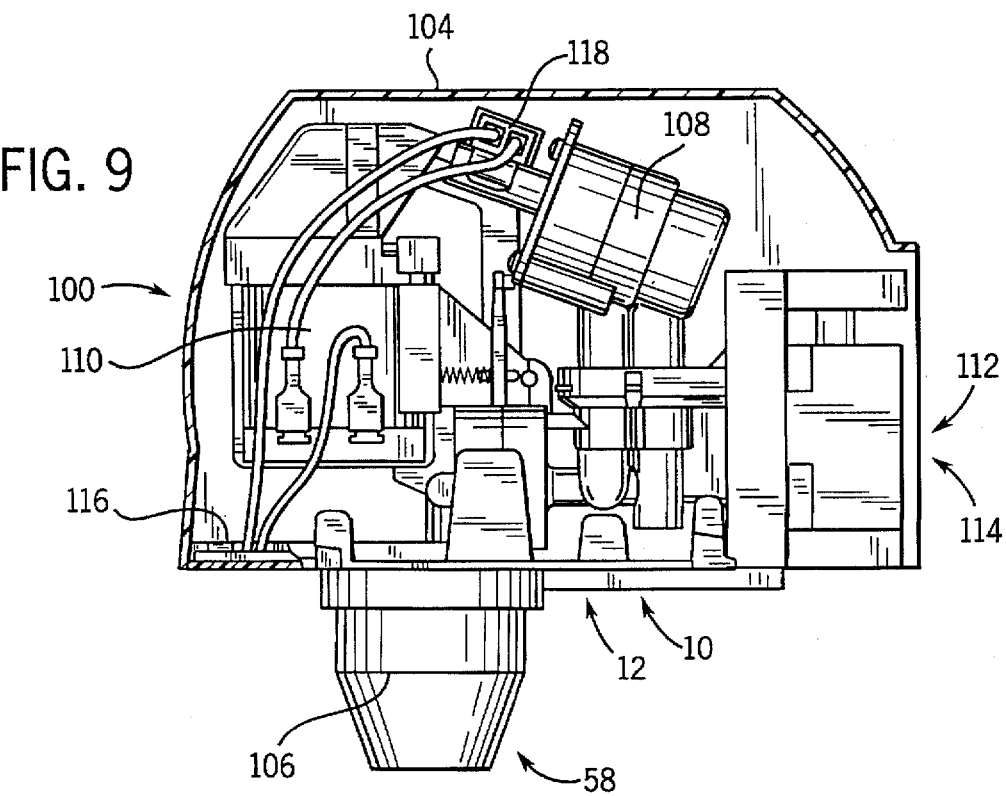
FIG. 9 is a side elevation view of the dispensing valve of FIG. 8 having the cover partially cut away.

Referring to FIG. 9, a detailed side view of dispensing valve 100 is shown having cover 104 partially cut away. Dispensing valve 100 has a mixing valve 108 actuated by a solenoid 110. Dispensing valve 100 has liquid inputs 112 and 114 for receiving syrup and carbonated water from a dispensing machine (not shown). Dispensing valve 100 has a circuit board 116 having the automatic dispenser control described with reference to FIGS. 1–7 thereon. Circuit board 116 is connected to transmitters 10 and receivers 12, and to solenoid 110, which in turn controls mixing valve 108. In this manner, the automatic dispensing control on circuit board 116 along with transmitters 10 and receivers 12 are connected to automatically control the mixing valve 108 of dispensing valve 100 when a container is in a desired position under dispenser 58.

Dispensing valve 100 also has a power input 118 connectable to the dispensing machine. Typically, the power input to the prior art lever actuated dispensing valves is 24V AC. Therefore, for compatibility, the preferred embodiment of the container-sensing dispensing valve 100 has a control 116 and solenoid 110 operable at 24V AC.

Figure 10:
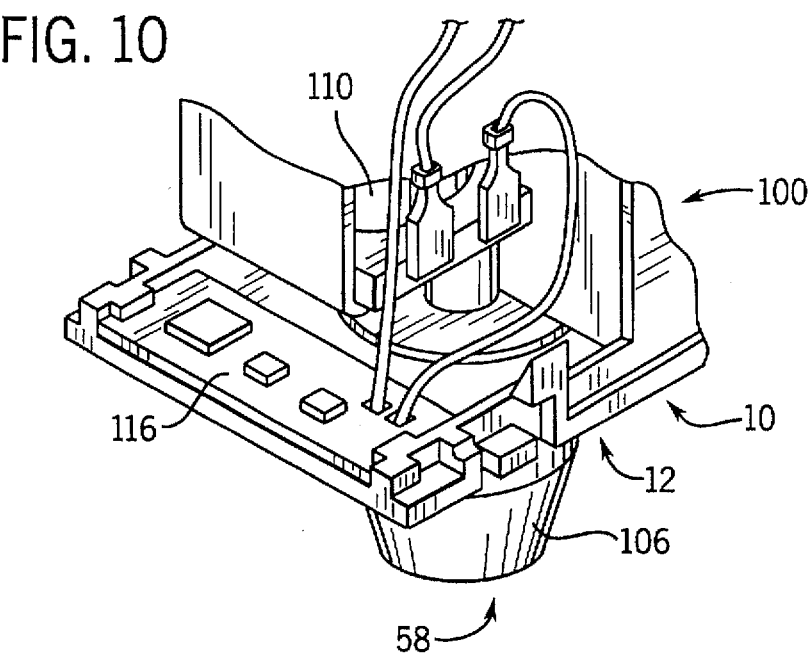
FIG. 10 is a perspective view of a portion of FIG. 9.

FIG. 10 shows a detailed view of a portion of the dispensing valve 100. Circuit board 116 is shown in a convenient place on dispensing valve 100 so as to preclude any manufacturing alterations to the body of the dispensing valve. Preferably however, the circuit board 116 is manufactured with transmitters 10 and receivers 12 incorporated therein, and the circuit board is placed above the desired location for transmitters 10 and receivers 12. Accordingly, since there are many different configurations of dispensing valves 100, the circuit boards can be configured to adapt to the particular dispensing valve to be converted. The circuit board 116 in FIG. 10 is shown for exemplary reasons, and is not meant to depict a manufacturable circuit board. The aforementioned description and Figures will enable one skilled in the art in producing such a circuit board.

FIG. 11 shows dispenser 100 having spigot 106, transmitter 10, and receiver 12 in operational relation with a container 48. As shown, transmitter 10 has an axis of projection 120 extending downwardly, and receiver 12 has an axis of reflection 122, also referred to as a line of reception, extending downwardly. As shown, transmitter 10 is mounted in dispenser 100 such that the axis of projection 120 is at right angles with plane 102. It has been found that an axis of reflection 122 of 15°–20°, as measured from the vertical, provides satisfactory detection of a variety of container sizes. However, it must be understood that the aforementioned angles are not critical, and the transmitter and receiver can be mounted at various angles to define a target intercept point and target window of desirability. FIG. 12 shows a rear view of dispenser 100 and container 48 along lines 12—12 of FIG. 11. FIG. 12 shows how three transmitters 12 can operate simultaneously to create an oval shaped target window for more accurate detection of container 48.

In operation, it has been found that the configuration shown in FIGS. 8–12 provides greater detection of clear containers since the energy being transmitted by transmitters 10 is being reflected off a thicker, longitudinal portion of container 48, as opposed to the thinner, side portions of container 48. Another advantage to this configuration is the virtual elimination of possible stray signals interfering with the automatic control. Not only is it unlikely that stray energy signals would be directed upward towards receiver 12, dispensing spigot 106 would effectively block any incoming stray signals from the operating environment. Additionally, the angle of receivers 12 is directed towards a back plane of the dispensing machine, as shown in FIG. 13, which will provide further blocking of any incoming stray signals.

As can be seen in FIG. 11, the present invention can begin to detect the container 48 at the intersection of the radiating cone of energy 126 with the cone of reception 128 at the leading edge 124 of container 48. In this manner, as container 48 is moved further inward as shown by arrow 130, the signal received by the receiver 12 becomes stronger since the energy is also reflected off the inner wall of container 48. This insures positive placement of container 48 under dispenser 58 prior to dispensing.

Figure 13:
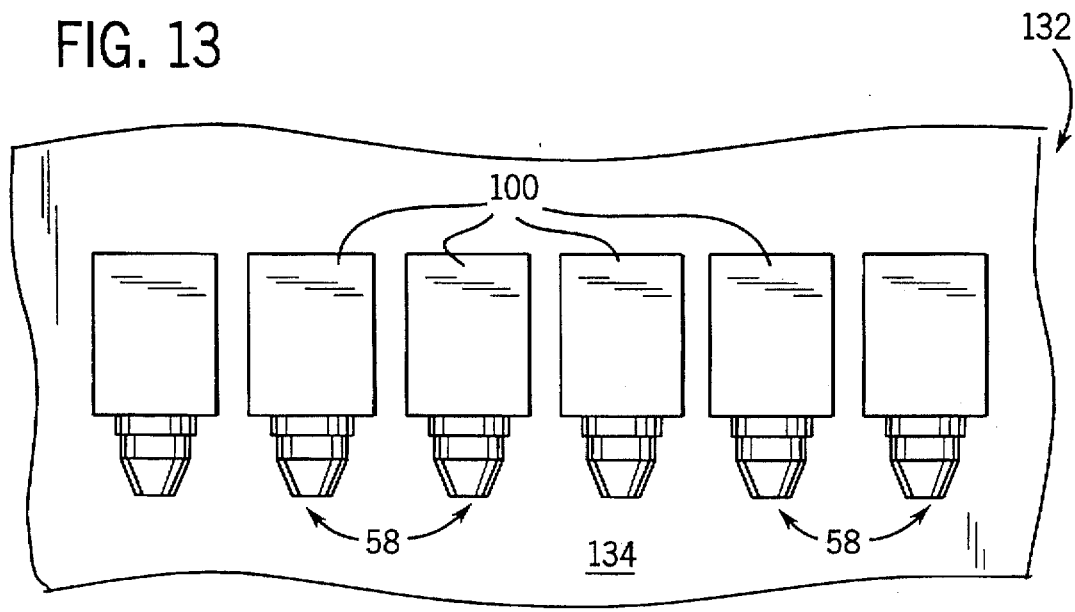
FIG. 13 shows a dispensing machine incorporating multiple dispensing valves of FIG. 8 in accordance with the present invention.

FIG. 13 shows a dispensing machine 132 having a plurality of the container-sensing dispensing valves 100. In this configuration, the circuit board 116, FIG. 9, can be located directly on the dispensing valve 100 as shown in FIG. 10, or alternately, behind front panel 134 of dispensing machine 132. In either case, the circuit board 116 is connected to control the mixing valve of each of the dispensing valves 100.

The present invention includes a method of retrofitting a dispensing machine having manually operated dispensing valves, with container-sensing dispensing valves of the present invention, to create an automatic dispensing machine. The method of retrofitting includes removing the cover from the manually operated dispensing valves, disconnecting the power supply from the manually operated dispensing valves, and removing the manually operated dispensing valves. The method of retrofitting next includes the step of installing the container-sensing dispensing valve of the present invention having an integrated control for detecting the presence and absence of a container under the dispensing valve and activating the dispenser according to the detection. A manually operated dispensing valve can include a lever actuated dispensing valve, a push button electric switch dispensing valve, or any other type of dispensing valve requiring physical contact.

The integrated control has at least one transmitter and receiver pair orientated in a generally horizontal plane such that a transmission from the transmitter converges with a line of reception from a receiver at a target window, as previously described. The integrated control also has a control circuit, also as previously described, connected to the transmitter and receiver pair which periodically activates the transmitter and periodically monitors the receiver to indicate the presence of a container in the target window when a reflected transmission is detected substantially synchronously with the activation of the transmitter, thereby indicating the container is in a desired position and activating the dispenser. The control also indicates the absence of the container when the monitored receiver does not detect at least one reflected transmission, thereby indicating the container is no longer in position and deactivating the dispenser. In other words, when the transmitter is activated, and the receiver is monitored, but does not receive an energy signal, a container is not in position under the dispenser, and the dispenser is either deactivated, or if already deactivated, no change occurs. By concluding that the container is absent when the monitored receiver does not detect at least one reflected transmission, signifies that the control can be preset to require any number of missing reflected transmissions before deactivating the dispenser.

The method of retrofitting lastly includes the steps of connecting the existing power supply from the dispensing machine to the container-sensing dispensing valve and installing the cover on the dispensing valve.

Figure 15:
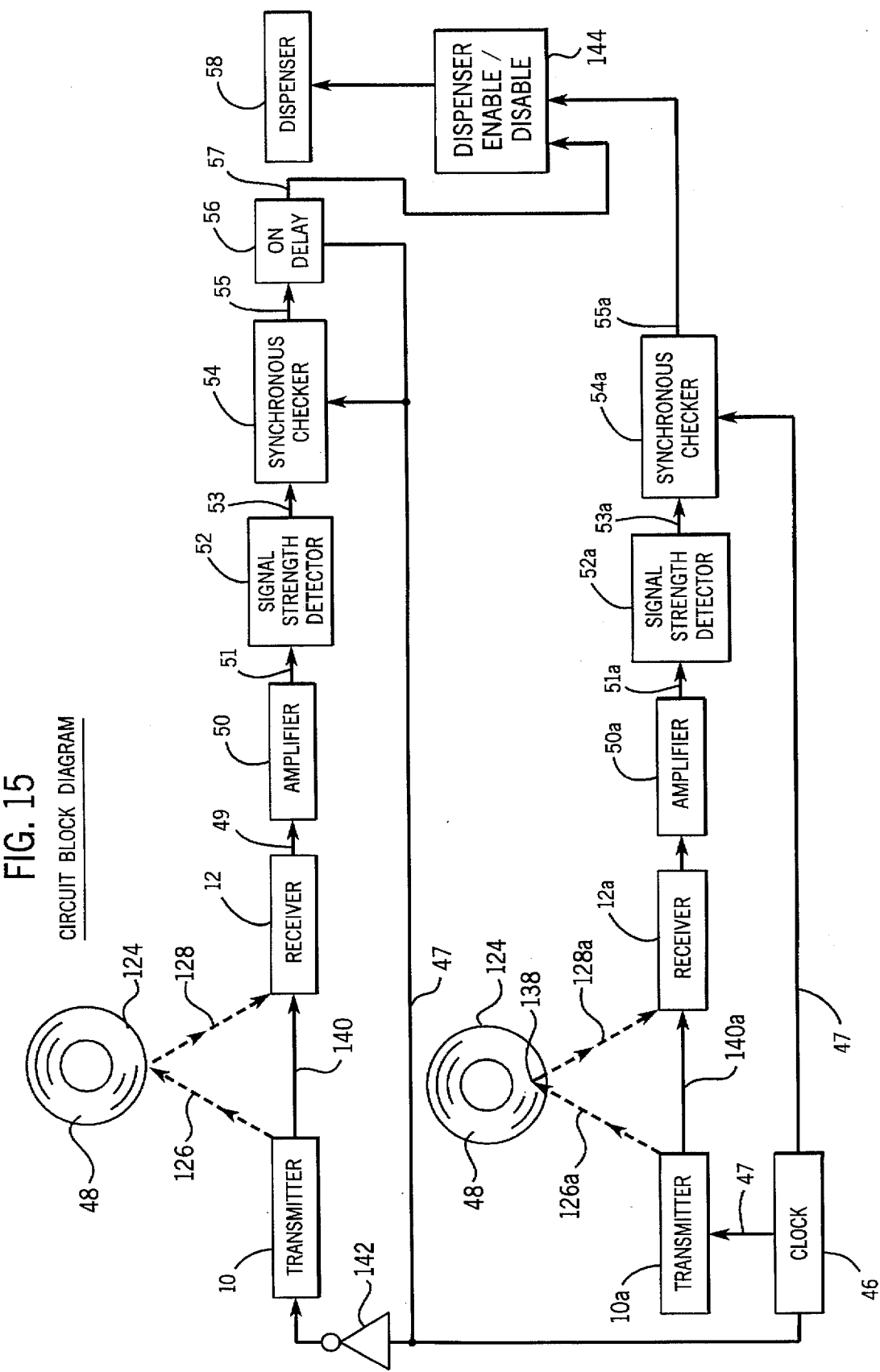
FIG. 15 is a circuit block diagram of a system in accordance with the present invention of FIG. 14.

FIGS. 14, 15, and 16 show another aspect of the invention that not only detects the presence of a container and controls the dispenser, but also provides level control of the dispensed product. In other words, when the dispensed product reaches a given level in a container, the control described in FIGS. 14-16 automatically deactivates the dispenser regardless of whether the container has been removed. In the following description, since FIG. 14 is similar to FIG. 11, FIG. 15 is similar to FIG. 5, and FIG. 16 is similar to FIG. 6, like reference characters are used where appropriate for ease of understanding.

FIG. 14 shows a dispenser 100 in operational relation with a container 48 similar to that of FIG. 11. However, FIG. 14 shows an additional transmitter 10a and receiver 12a for providing level control in container 48. Preferably, transmitter boa is recessed in dispenser 100 farther than transmitter 10 to provide a more focused transmission 136 which extends into container 48, strikes an inner side wall of container 48 at 138, and is reflected as reflection 139. As long as the level of the product dispensed is not at or above the inner side wall at 138, a relatively strong reflection of transmission 136 is reflected to receiver 12a to indicate that dispensing should continue. Once the product level in container 48 reaches above the point of reflection of transmission 136 in container 48, the product either absorbs much of the transmission, or scatters the transmission such that any reception by receiver 12a is weak and can be ignored by a signal strength detector, depending upon the type of product being dispensed in container 48. As is readily evident from FIG. 14, additional transmitters 10a and receivers 12a can be incorporated into dispensing valve 100 to monitor the product level as it rises in container 48 and provide more accurate level control for a wider variety of container sizes. As is later described, each transmitter and receiver pair is sequentially enabled to avoid any interfering signals between the pairs of transmitters and receivers.

FIG. 15 shows a circuit block diagram of the circuit used to implement the system of FIG. 14. The circuit of FIG. 15 is similar to that shown in FIG. 5, and reference is made to the description of FIG. 5 for a complete understanding of the circuit of FIG. 15. As shown in FIG. 15, transmitter 10 and receiver 12 detect the presence of container 48 in the target window. Receiver 12 is connected to amplifier 50, signal strength detector 52, synchronous checker 54, and on delay 56 as is previously described. A dispenser enable/disable 144 is added to accommodate the additional circuitry as later described. Receiver 12 is enabled only during a transmission from transmitter 10 as indicated by 140. Similarly, receiver 12a is enabled only during a transmission from transmitter 10a as indicated by 140a.

Transmitter 10 is shown radiating energy 126 toward a top view of container 48 having a leading edge 124, and is reflected as energy 128 to receiver 12. Transmitter 10a is shown transmitting energy 126a into a top view of container 48, reflecting off the inner side wall at 138, and reflected back as energy 128a to receiver 12a. Both transmitters 10 and 10a are connected to clock 46, but to demonstrate the sequential operation of a transmitter pair, transmitter 10 is connected to clock 46 through an inverter gate 142. In this manner, transmitter and receiver pair 10a, 12a are enabled at one point in time by clock 46, while transmitter and receiver pair 10, 12 are enabled at some next point in time, other than when transmitter and receiver pair 10a, 12a are enabled.

The receiver 12a is connected similarly as receiver 12, in that it is connected to an amplifier 50a, a signal strength detector 52a, and a synchronous checker 54a. Synchronous checker 54a is then connected to the dispenser enable/disable 144, which is connected to enable and disable the dispenser 58.

In operation, when receiver 12a receives a signal strong enough to pass signal strength detector 52a and synchronous with clock 46 at synchronous checker 54a, indicates to the dispenser enable/disable 144 to continue dispensing from dispenser 58. However, once the product level rises in container 48 above point 138, and receiver 12a does not receive a signal strong enough to pass signal strength detector 52a, synchronous checker 54a continues to produce a low signal to dispenser enable/disable 144 which then disables dispenser 58 signifying a full condition in the container.

Figure 16B:
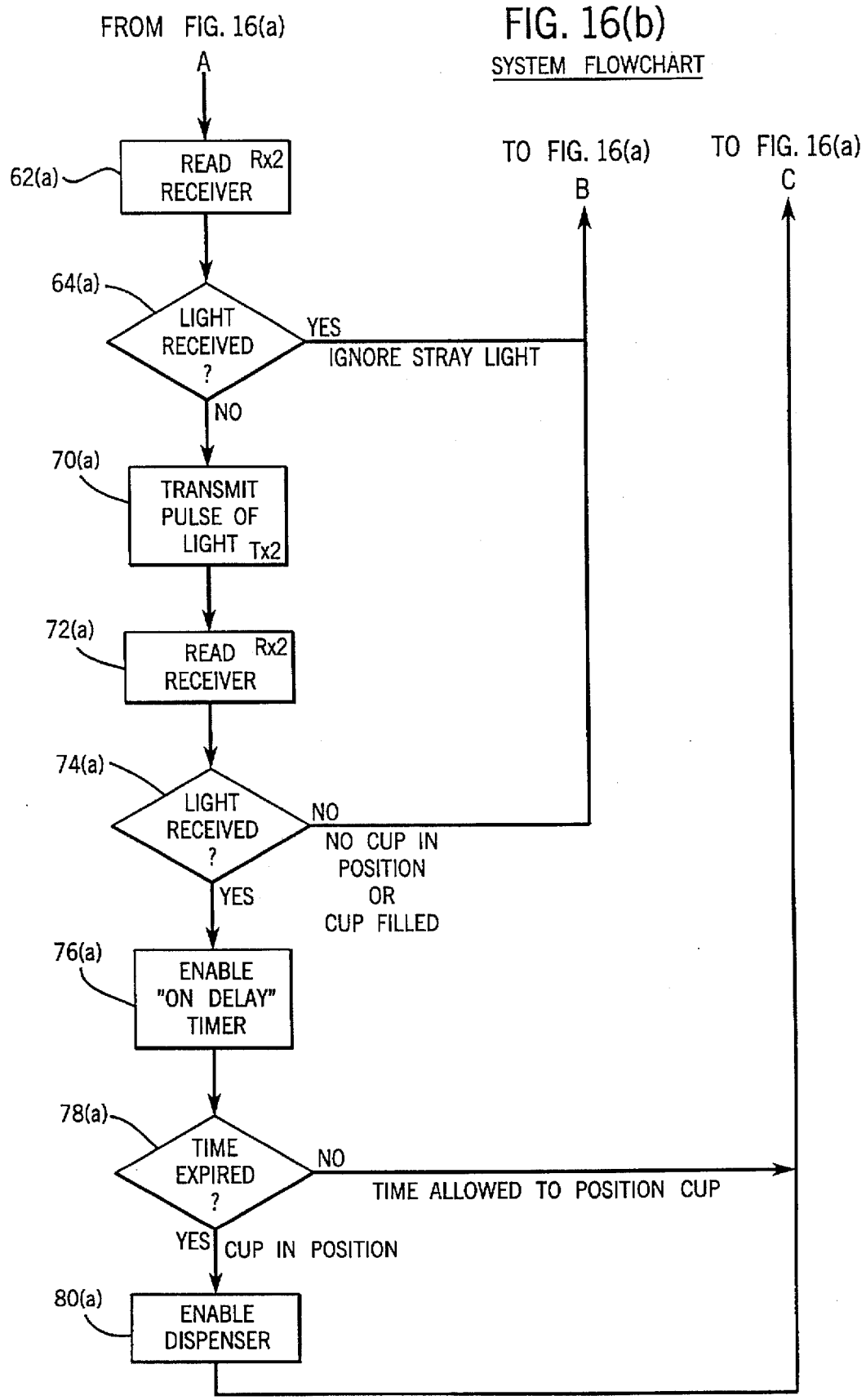

FIG. 16(a)–(b) is a system flow chart to assist in the understanding of FIGS. 14 and 15, and guide implementing the device with a microprocessor and software. FIG. 16(a) and FIG. 16(b) are each individually similar to FIG. 6 in that the system of FIG. 6 is shown to sequentially operate multiple transmitter and receiver pairs. FIG. 16(a) shows the operation of the first transmitter and receiver pair wherein after power-up 60, the first receiver Rx1 is read at 62 and if an energy signal is received at 64, it is considered stray energy and the dispenser is disabled 68. Where no energy is received at 64 in the first receiver Rx1, the first transmitter Tx1 is enabled 70, and the first receiver Rx1 is again read at 72. If no energy is received at 74, there is no cup in position and the dispenser is disabled at 68 by resetting the on delay timer 66. Where energy is received by the first receiver Rx1 at 74, the on delay timer is enabled 76 and after the delay timer expires, and the cup is still present 78, the dispenser is enabled at 80.

As previously described, multiple additional transmitter and receiver pairs can be used for monitoring fill level in the container 48. FIG. 16(b) shows generically how further transmitter and receiver pairs TxZ and RxZ function. In the case of one additional transmitter and receiver as shown in FIG. 14, the flow chart would end with FIG. 16(b). In the event of additional transmitter and receiver pairs, the flow chart of FIG. 16(b) would be duplicated for as many transmitter and receiver pairs as are desired.

After a transmitter and receiver pair is enabled and monitored, as is shown in FIG. 16(b), and if light is received by a second or subsequent receiver RxZ at 74(a), either the cup is no longer in position or the cup is filled to the indication point 138, wherein the dispenser is disabled at 68 by resetting the on delay timer 66. On the other hand, as long as light is received from the receiver RxZ at 74(a), the dispenser is continued to be enabled 80(a) and the system goes back to reiterate to read the first receiver Rx1 at 62.

The method and device of the present invention is not limited to light as a source of energy, but is functional with any energy source, such as electromagnetic radiation in the optical wavelength range including infrared, visible, and ultraviolet. The preferred embodiment uses infrared transmitters and receivers because they are very reliable, readily available, long-lasting, and relatively inexpensive. However, one skilled in the art will recognize that other energy sources can be readily substituted for infrared, such as sound waves (ultrasonic for example), or other wavelength energy sources in the electromagnetic radiation spectrum (such as radio or microwave). At the present time, it is not as economical to use ultrasonic, and radio waves are subject to excessive interference. However, these energy forms may be appropriate in some situations and applications of the present invention. These and other equivalents, alternatives, and modifications are possible and within the scope of the appended claims.

We claim:

1. An automatic dispenser control which detects when a container is in a desired position and activates a dispenser comprising:

a clock producing constant periodic clock pulses;

a transmitter having an input and an output, said input receiving the periodic clock pulses and the output emitting pulses of energy responsive thereto along an axis of projection;

a receiver having an energy sensing input receiving the energy pulses along an axis of reflection, said receiver having an output providing an energy indicative signal;

the transmitter and receiver being orientated in a common plane and having said axes of projection and reflection extending out of said common plane and converging to a target intercept point associated with the desired position;

a synchronous checker producing a signal only when an energy indicative signal resulting from a given emitted energy pulse occurs substantially synchronously with the periodic clock pulse causing the given emitted energy pulse from the transmitter; and wherein the production of the signal indicates the container is in position and activates the dispenser, and the absence of the signal indicates the container is no longer in position and deactivates the dispenser.

2. The control of claim 1 wherein the transmitter and receiver are mounted in a generally vertical plane.

3. The control of claim 1 wherein the transmitter and receiver are mounted in a generally horizontal plane.

4. The control of claim 1 incorporated into a dispensing valve comprising a mixing valve, a dispensing spigot and the automatic dispenser control, wherein the transmitter and receiver of the control are orientated adjacent the dispensing spigot having the axes of projection and reflection extending downwardly, and wherein the automatic dispensing control is connected to control the mixing valve of the dispensing valve.

5. The control of claim 1 incorporated into a dispensing machine having at least one dispensing valve comprising a mixing valve and a dispensing spigot, wherein the transmitter and receiver of the control are orientated adjacent the dispensing spigot and have the axes of projection and reflection extending downwardly, and wherein the automatic dispensing control is remotely mounted in the dispensing machine and is connected to control the mixing valve of the dispensing valve.

6. The control of claim 1 further comprising a signal strength detector receiving the energy indicative signal generated by the receiver and producing a signal strength signal when the energy indicative signal bears a predetermined relationship to a predetermined parameter, and wherein the synchronous checker is further defined as producing a synchronous signal when the signal strength signal occurs substantially synchronously with the periodic clock pulse.

7. The control of claim 1 wherein said transmitter emits pulses of energy having the same periodicity as the clock pulses.

8. The control of claim 1 wherein said transmitter and receiver are mounted so that said axes of projection and reflection each subtend a mounting angle measured from said common plane, the mounting angle being selected to establish the target intercept point with respect to the common plane.

9. The control of claim 8 wherein the transmitter and receiver are mounted such that the mounting angle of the transmitter is not equal to the mounting angle of the receiver.

10. The control of claim 1 wherein the transmitter and the receiver are mounted a mounting distance apart in said common plane, the mounting distance being selected to establish the target intercept point with respect to the common plane.

11. The control of claim 1 wherein the transmitter is a light emitting diode.

12. The control of claim 1 wherein said transmitter provides pulses of energy having a radiation pattern and said receiver senses the pulses of energy within a sensing pattern, and wherein the radiation and sensing patterns are each measured by an included angle and together define a target window containing the target intercept point, the target window having a size dependent on the radiation and sensing patterns.

13. The control of claim 12 wherein the transmitter has a cone shaped radiation pattern and the receiver has a cone shaped sensing pattern and wherein the target window is a volumetric shape of intersecting cones.

14. The control of claim 12 wherein said transmitter and receiver are mounted to control the included angle and form a target window of desired size.

15. The control of claim 12 wherein at least one of the transmitter and receiver is situated in an orifice to reduce the included angle to focus the radiation pattern or the sensing pattern.

16. The control of claim 1 wherein the transmitter and receiver are mounted such that the pulse of energy is focused and is emitted into the container and reflects off an inside wall of the container to the receiver.

17. The control of claim 16 wherein the transmitter and receiver are connected to a dispenser enable/disable to control a level of dispensed product into the container.

18. The control of claim 1 further comprising at least a second transmitter and receiver pair sequentially enabled with the first transmitter and receiver, wherein the second transmitter and receiver pair are mounted such that a pulse of energy is focused and is emitted into the container and reflects off an inside wall of the container to the receiver.

19. The control of claim 18 wherein the second transmitter and receiver pair is connected to a dispenser enable/disable to control a level of dispensed product into the container.

20. In a beverage dispensing valve assembly having a mixing valve, an actuating solenoid, a dispensing spigot, and a power input, wherein power supplied from the power input to the actuating solenoid actuates the mixing valve to dispense a beverage from the dispensing spigot, the improvement comprising an integrated control connected to the power input and the actuating solenoid, the control comprising at least one transmitter and receiver pair oriented in a generally horizontal plane such that a transmission from a transmitter converges with a line of reception from a receiver at a target window, and a control circuit connected to the transmitter and receiver pair, the control circuit periodically activating the transmitter and periodically monitoring the receiver to indicate the presence of a container in the target window when a reflected transmission is detected substantially synchronously with the activation of the transmitter thereby indicating the container is in a desired position and activating the dispenser, and indicating the absence of the container when the monitored receiver does not detect at least one reflected transmission thereby indicating the container is no longer in position and deactivating the dispenser.

21. The improvement of claim 20 wherein the control comprises three transmitters.

22. The improvement of claim 20 wherein the control comprises three receivers.

23. A method of retrofitting a dispensing machine having manually operated dispensing valves with container-sensing dispensing valves to create an automatic dispensing machine comprising the steps of:

(1) removing the cover from the manually operated dispensing valve;

(2) disconnecting the power supply from the manually operated dispensing valve;

(3) removing the manually operated dispensing valve;

(4) installing a container-sensing dispensing valve having an integrated control for detecting the presence and absence of a container under the dispensing valve and activating the dispenser according to the detection, the integrated control comprising at least one transmitter and receiver pair oriented in a generally horizontal plane such that a transmission from a transmitter converges with a line of reception from a receiver at a target window below the dispensing valve, and a control circuit connected to the transmitter and receiver pair, the control circuit periodically activating the transmitter and periodically monitoring the receiver to indicate the presence of the container in the target window when a reflected transmission is detected substantially synchronously with the activation of the transmitter thereby indicating the container is in position and activating the dispenser, and indicating the absence of the container when the monitored receiver does not detect one or more reflected transmissions, thereby indicating the container is no longer in position and deactivating the dispenser;

(5) connecting the existing power supply from the dispensing machine to the container-sensing dispensing valve; and (6) installing the cover on the container-sensing dispensing valve.

24. A triangulation position detector for detecting the presence of an object within a predetermined target window comprising:

a clock producing constant periodic clock pulses;

a transmitter having an input and an output, said input receiving the periodic clock pulses and the output emitting pulses of energy responsive thereto along an axis of projection;

a receiver having an energy sensing input receiving the energy pulses along an axis of reflection, said receiver having an output providing an energy indicative signal;

a synchronous checker producing a signal only when an energy indicative signal resulting from a given emitted energy pulse occurs substantially synchronously with the periodic clock pulse causing the given emitted energy pulse; and wherein the production of the signal indicates the object is in position and the absence of the signal indicates the object is no longer in position.

25. The detector of claim 24 wherein the transmitter and receiver are orientated in a common plane and have said axes of projection and reflection extending out of said common plane and converging to a target intercept point associated with the desired position.

26. The detector of claim 24 further comprising a signal strength detector receiving the energy indicative signal generated by the receiver and producing a signal strength signal when the energy indicative signal bears a predetermined relationship to a predetermined parameter, and wherein the synchronous checker is further defined as producing a synchronous signal when the signal strength signal occurs substantially synchronously with the periodic clock pulse.

27. The detector of claim 24 wherein said clock pulses have a pulse width and wherein said transmitter emits pulses of energy having a time of emission equal to the pulse width of the clock pulses.

28. A method of detecting the presence of a container under a dispensing spigot and automatically dispensing a product into the container in response to container detection, said method comprising the steps of:

arranging a transmitter and a receiver in a common plane so that an axis of projection of the transmitter and an axis of reflection of the receiver converge at a target intercept point in a target window;

producing constant periodic clock pulses;

emitting pulses of energy from the transmitter in response to the periodic clock pulses;

placing the container within the target window to reflect at least a portion of the pulses of energy toward the receiver;

receiving the reflected pulses of energy at the receiver and creating responsive energy indicative signals;

producing a signal only when an energy indicative signal resulting from a given emitted energy pulse occurs substantially synchronously with the periodic clock pulse causing the given emitted energy pulse; and activating a dispenser in response to the signal and deactivating the dispenser in response to the absence of the signal.

29. The method of claim 28 further comprising the step of delaying the synchronous signal for a given period of time to ensure the container is in place below the dispensing spigot.

30. The method of claim 28 further comprising the step of comparing the energy indicative signal to a predetermined parameter for producing a synchronous signal when the energy indicative signal bears a predetermined relationship to the parameter to ensure the container is sufficiently within the target window.

31. A method of detecting the presence of an object comprising the steps of:

arranging a transmitter and a receiver in a common plane so that an axis of projection of the transmitter and an axis of reflection of the receiver converge at a target intercept point in a target window;

producing constant periodic clock pulses;

emitting pulses of energy from the transmitter in response to the periodic clock pulses;

placing the object within the target window to reflect at least a portion of the pulses of energy toward the receiver;

receiving the reflected pulses of energy at the receiver and creating responsive energy indicative signals;

producing a signal only when an energy indicative signal resulting from a given emitted energy pulse occurs substantially synchronously with the periodic clock pulse causing the given emitted energy pulse;

indicating the presence of the object in response to the signal: and resetting said indication whenever an energy indicative signal occurs other than substantially synchronously with a periodic clock pulse.

32. The method of claim 31 further comprising the step of comparing the energy indicative signal to a predetermined parameter to ensure the object is sufficiently within the target window.

* * * * *

UNITED STATES PATENT AND TRADEMARK OFFICE
CERTIFICATE OF CORRECTION

PATENT NO.  : 5,744,793
DATED       : April 28, 1998
INVENTOR(S) : Skell et al.

It is certified that error appears in the above-identified patent and that said Letters Patent is hereby corrected as shown below:

On the cover page, item [75], delete "Hubortus" and replace with --Hubertus--;

Column 7, line 47, delete "the size of";

Column 7, line 48, insert --the size of-- between "increases" and "target";

Column 9, line 6, insert --.-- after "width";

Column 9, line 16, delete "the presence of" after "indicative";

Column 9, line 17, insert --the presence of-- between "indicate" and "a";

Column 12, line 10, delete "boa" and substitute therefor --10a--;

Signed and Sealed this

Twenty-second Day of September, 1998

Attest:

BRUCE LEHMAN

Attesting Officer     Commissioner of Patents and Trademarks